US008225392B2

(12) United States Patent
Dubrovsky et al.

(10) Patent No.: US 8,225,392 B2
(45) Date of Patent: Jul. 17, 2012

(54) IMMUNIZING HTML BROWSERS AND EXTENSIONS FROM KNOWN VULNERABILITIES

(75) Inventors: Opher Dubrovsky, Redmond, WA (US); Boaz Ein-Gil, Haifa (IL); Jiahe Helen Wang, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 912 days.

(21) Appl. No.: 11/183,329

(22) Filed: Jul. 15, 2005

(65) Prior Publication Data
US 2007/0016948 A1 Jan. 18, 2007

(51) Int. Cl.
H04L 29/06 (2006.01)
(52) U.S. Cl. .......................................................... 726/22
(58) Field of Classification Search .................. 726/22
See application file for complete search history.

(56) References Cited

U.S. PATENT DOCUMENTS

| | | | | |
|---|---|---|---|---|
| 5,659,539 | A | * | 8/1997 | Porter et al. ................... 709/231 |
| 5,675,762 | A | * | 10/1997 | Bodin et al. ................... 711/206 |
| 6,076,109 | A | | 6/2000 | Kikinis |
| 6,253,326 | B1 | | 6/2001 | Lincke et al. |
| 6,266,681 | B1 | * | 7/2001 | Guthrie ........................ 715/234 |
| 6,275,937 | B1 | * | 8/2001 | Hailpern et al. ............. 713/188 |
| 6,553,410 | B2 | | 4/2003 | Kikinis |
| 6,711,675 | B1 | | 3/2004 | Spiegel et al. |
| 6,920,560 | B2 | | 7/2005 | Wallace, Jr. |
| 7,155,737 | B1 | | 12/2006 | Lim et al. |
| 7,159,237 | B2 | | 1/2007 | Schneier et al. |
| 7,188,363 | B1 | | 3/2007 | Boutros et al. |
| 7,191,252 | B2 | | 3/2007 | Redlich et al. |
| 7,194,744 | B2 | | 3/2007 | Srivastava et al. |
| 7,263,561 | B1 | * | 8/2007 | Green et al. ................... 709/246 |
| 7,392,545 | B1 | | 6/2008 | Weber et al. |
| 7,398,533 | B1 | | 7/2008 | Slaughter et al. |
| 7,620,719 | B2 | | 11/2009 | Tock et al. |
| 7,640,434 | B2 | * | 12/2009 | Lee et al. ...................... 713/182 |
| 7,650,638 | B1 | | 1/2010 | Njemanze et al. |
| 7,904,278 | B2 | | 3/2011 | Wilson et al. |
| 2002/0010855 | A1 | * | 1/2002 | Reshef et al. ................. 713/164 |
| 2002/0073119 | A1 | | 6/2002 | Richard |
| 2002/0104023 | A1 | | 8/2002 | Hewett et al. |

(Continued)

FOREIGN PATENT DOCUMENTS

| | | |
|---|---|---|
| JP | 11167487 | 6/1999 |
| JP | 2002290900 | 10/2002 |
| JP | 2004318816 | 11/2004 |
| WO | WO0213026 A1 | 2/2002 |
| WO | WO 0213026 A1 * | 2/2002 |
| WO | WO2004077294 | 9/2004 |

OTHER PUBLICATIONS

Wang et al, "Shield: Vulnerability-Driven Network Filters for Prevenying Known Vulnerability Exploits", Sep. 3, 2004, ACM, SIGCOMM'04, pp. 193-204.*

(Continued)

Primary Examiner — Michael S McNally
(74) Attorney, Agent, or Firm — Lee & Hayes, PLLC

(57) ABSTRACT

An exemplary computer-implementable method (300) transforms or "immunizes" information to reduce or eliminate risk of exploitation of a known vulnerabilty of a software service and includes receiving information (304) in response to a request, transforming the information (308) to produce transformed information and sending the transformed information (312). An exemplary firewall server (112) includes server software (144, 148) that allows the firewall server (112) to receive information from a resource (104, 108) via a network and to send information to a client computer (114) and an immunization component (264, 268) for immunizing the information to prevent exploitation of a vulnerabilty of browser software (154) on the client computer (114). Various other exemplary methods, devices, systems, etc., are also disclosed.

20 Claims, 9 Drawing Sheets

U.S. PATENT DOCUMENTS

| | | | |
|---|---|---|---|
| 2002/0124181 A1* | 9/2002 | Nambu | 713/200 |
| 2002/0129239 A1 | 9/2002 | Clark | |
| 2003/0014659 A1 | 1/2003 | Zhu | |
| 2003/0037261 A1 | 2/2003 | Meffert et al. | |
| 2003/0097591 A1* | 5/2003 | Pham et al. | 713/201 |
| 2003/0163448 A1 | 8/2003 | Kilemba et al. | |
| 2003/0177390 A1 | 9/2003 | Radhakrishnan | |
| 2004/0039752 A1 | 2/2004 | Goldfuss, Jr. et al. | |
| 2004/0123137 A1 | 6/2004 | Yodaiken | |
| 2004/0123157 A1* | 6/2004 | Alagna et al. | 713/201 |
| 2004/0151323 A1 | 8/2004 | Olkin et al. | |
| 2004/0230825 A1 | 11/2004 | Shepherd et al. | |
| 2005/0015752 A1 | 1/2005 | Alpern et al. | |
| 2005/0021791 A1 | 1/2005 | Sakiyama et al. | |
| 2005/0066311 A1 | 3/2005 | Hagmeier et al. | |
| 2005/0071616 A1 | 3/2005 | Zimmer et al. | |
| 2005/0108554 A1 | 5/2005 | Rubin et al. | |
| 2005/0149726 A1* | 7/2005 | Joshi et al. | 713/164 |
| 2005/0154885 A1 | 7/2005 | Viscomi et al. | |
| 2005/0182928 A1 | 8/2005 | Kamalanathan et al. | |
| 2005/0193329 A1 | 9/2005 | Kickel | |
| 2005/0223413 A1 | 10/2005 | Duggan et al. | |
| 2005/0235200 A1 | 10/2005 | Goldberg | |
| 2005/0268214 A1 | 12/2005 | Lu | |
| 2005/0283719 A1 | 12/2005 | Awamoto et al. | |
| 2006/0036746 A1 | 2/2006 | Davis | |
| 2006/0041834 A1 | 2/2006 | Chen et al. | |
| 2006/0053411 A1 | 3/2006 | Takamiya | |
| 2007/0011744 A1* | 1/2007 | Carothers et al. | 726/24 |
| 2007/0016949 A1 | 1/2007 | Dunagan et al. | |
| 2007/0113282 A1 | 5/2007 | Ross | |
| 2009/0183171 A1 | 7/2009 | Isaacs et al. | |

OTHER PUBLICATIONS

Chen et al., "A Systematic Approach to Uncover Security Flaws in GUI Logic", IEEE Symposium on Security and Privacy, May 2007, 15 pgs.

Howell et al., "MashupOS: Operating System Abstractions for Client Mashups", Proceedings 11th USENIX workshop on Hot Topics in Operating Systems, 2007, 7 pgs.

Wang et al., "Protection and Communication Abstractions for Web Browers in MashupOS", SOSP07, ACM, Oct. 2007, 15 pgs.

Wang et al., "The Multi-Principal OS Construction of the Gazelle Web Browser", Microsoft Research, White Paper, Feb. 2009, 16 pgs.

Chang, "An Adaptive Distributed Object Framework for the Web", Doctoral Symposium and 14th Workshop for Phd Students in Object Oriented Systems (PhD))S04), Jun. 2004, 10 pgs.

Murphy, et al., "Securing the Enterprise from Malware Threats", retrieved Mar. 28, 2006 at http://www.surfcontrol.com/uploadedfiles/general/white_papers/Malware_Whitepaper.pdf, 14 pgs.

Wahbe, et al. "Efficient Software-Based Fault Isolation"; 1993 ACM SIGOPS; pp. 203-216.

Extended European Search Report mailed on Feb. 22, 2011 for European Patent Application No. 06786875.2, a counterpart foreign application for U.S. Appl. No. 11/183,329.

"Internet-based Content Security Protection in the Net", Stream Shield, Internet Citation, 2004, retrieved from <<http://www.streamshield.com/resources/whitepapers.php>> on Dec. 20, 2005, 19 pgs.

Martin, et al., "Blocking Java Applets at the Firewall", Proceedings of the Network and Distributed System Security Symposium, San Diego, CA, Feb. 10-11, 1997, IEEE Computer. Soc., pp. 16-26.

Non-Final Office Action for U.S. Appl. No. 11/426,785, mailed on Jun. 27, 2011, John Dunagan, "Browser Protection Module", 21 pgs.

Translated Chinese Office Action mailed Jul. 26, 2011 for Chinese patent application No. 200680025529.2, a counterpart foreign application of U.S. Appl. No. 11/183,329, 11 pages.

Translated Japanese Office Action mailed Sep. 9, 2011 for Japanese patent application No. 2008-521517, a counterpart foreign application of U.S. Appl. No. 11/183,329, 5 pages.

European Office Action mailed Oct. 17, 2011 for European patent application No. 06786875.2, a counterpart foreign application of U.S. Appl. No. 11/183,329, 5 pages.

Malkhi, et al., "Secure Execution of Java Applets Using a Remote Playground", IEEE Transactions on Software Engineering, vol. 26, Issue 12, Dec. 2000, pp. 1197-1209.

* cited by examiner

Exemplary Method 500

Exemplary Method 600

Exemplary Scenario 800

Suspect Code 830

```
<HTML>
    ⋮
<SCRIPT LANGUAGE = JScript >
    var string1="<FRAME SRC=file://BBBBBBBBBBBBBBBBBBBBBBBBBBBBB>";
    document.body.innerHTML = string1;
</SCRIPT>
    ⋮
</HTML>
```

Exemplary Immunization Code Segment 850

```
<SCRIPT LANGUAGE ='JScript'>
        var fixed = 0;
        function abcd() {     ◄─── Exemplary Immunization Function 854
        if (!fixed) {
        var TheElement;
        TheElement = event.srcElement;
        ElementText=TheElement.innerHTML;

var string = "<P> changed after capture </P>"
        fixed = 1;
        if ((TheElement.indexOf('<FRAME') != -1) && (TheElement.length>25)){
            //fix document
            document.body.innerHTML = string;
        }
        }
</SCRIPT>
```

```
<HTML>             Exemplary Immunized Code 870
    ⋮
<BODY onpropertychange="abcd()">  ◄─── Exemplary Immunization Hook 874
<SCRIPT LANGUAGE = JScript >
    var string1="<FRAME SRC=file://BBBBBBBBBBBBBBBBBBBBBBBBBBBBB>";
    document.body.innerHTML = string1;
</SCRIPT>
</BODY>
    ⋮
</HTML>
```

Fig. 8

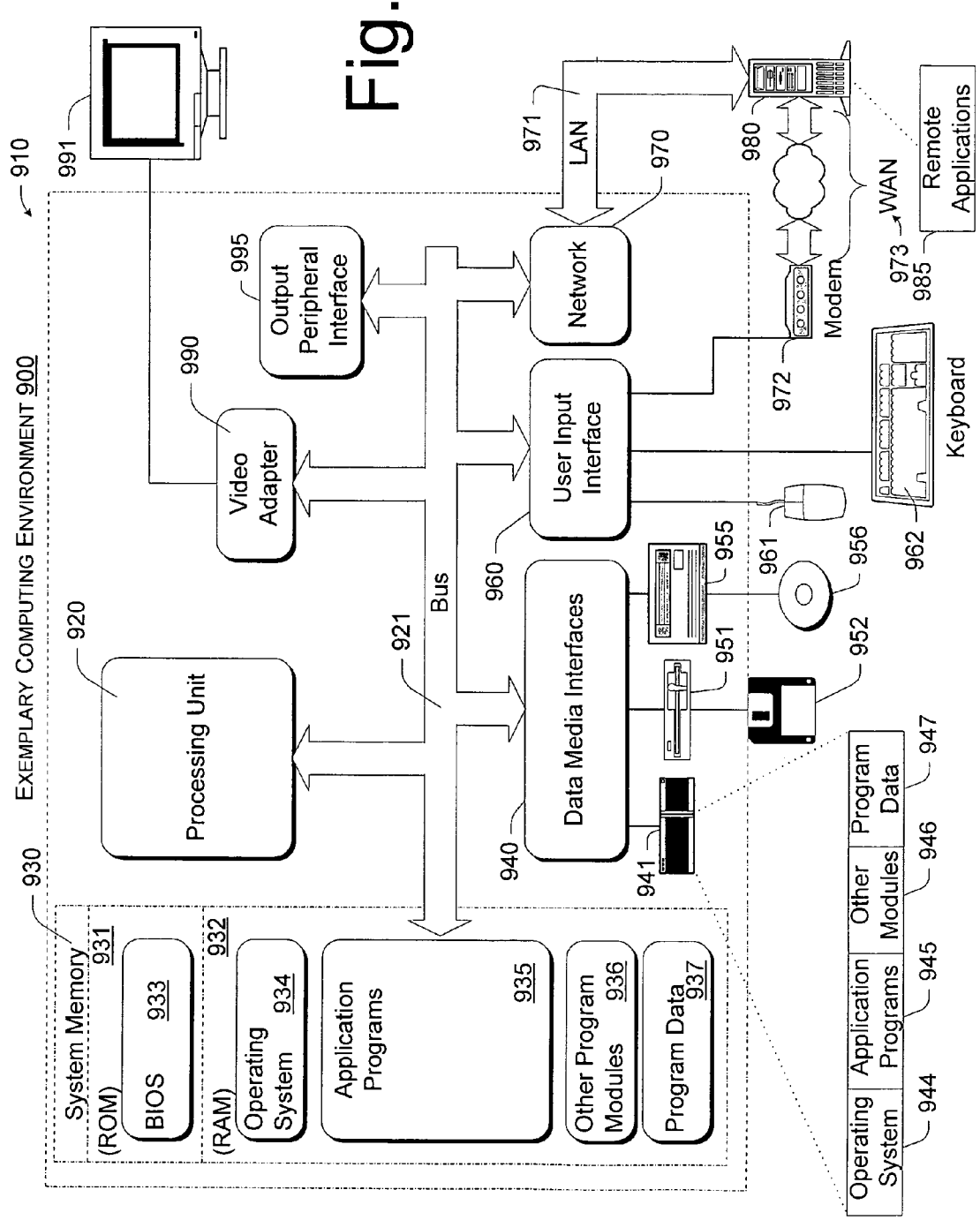

IMMUNIZING HTML BROWSERS AND EXTENSIONS FROM KNOWN VULNERABILITIES

BACKGROUND

Many recently discovered browser software vulnerabilities are related to HTML code. Patches for such vulnerabilities are not always installed quickly, which increases risk of attack. For example, in many cases a user may take weeks or even month to install the latest patches. During this time, the user's software is vulnerable to attacks. Various exemplary technologies disclosed herein address ways to reduce or eliminate risk of attack on or through software services.

SUMMARY

Various exemplary methods, devices, systems, etc., described herein act to prevent exploitation of known vulnerabilities that exist in software services such as browser software and related extensions. For example, an exemplary software framework can transform an HTML web page by inserting script into the HTML web page where the inserted script, upon execution, prevents the HTML web page from exploiting a known vulnerability associated with a user's web browser software.

Various exemplary mechanisms can act, more generally, to prevent exploitation of known vulnerabilities that exist in software services that take scripts and other data for input operations. Such software services include, for example, those that take SQL scripts. Various other exemplary methods, devices, systems, etc., are also disclosed.

BRIEF DESCRIPTION OF THE DRAWINGS

Non-limiting and non-exhaustive examples are described with reference to the following figures, wherein like reference numerals generally refer to like parts throughout the various views unless otherwise specified.

FIG. 8 is a diagram of an exemplary scenario for immunizing code.

FIG. 9 is a diagram of an exemplary computing environment, which may be used to implement various exemplary technologies described herein.

DETAILED DESCRIPTION

Various exemplary methods, devices, systems, etc., described herein act to prevent exploitation of known vulnerabilities that exist in software services such as browser software and related extensions. For example, an exemplary software framework can transform an HTML web page by inserting script into the HTML web page where the inserted script, upon execution, prevents the HTML web page from exploiting a known vulnerability associated with a user's web browser software. In this example, the inserted script "immunizes" the HTML web page for the known web browser software vulnerability, i.e., the immunized HTML web page cannot "infect" the web browser software. Such an exemplary framework may examine the HTML web page for a need to immunize or it may simply immunize the HTML web page without an examination for indicia of exploitation mechanisms. The process of immunizing or transforming generally involves inserting or otherwise associating code with received information (e.g., code, data, code and data) or altering (e.g., changing, deleting, etc.) received information to prevent the received information from exploiting a known vulnerability.

With respect to inserted immunization script, such code generally contains logic to prevent exploitation of one or more known vulnerabilities associated with a software service (e.g., web browser software, etc.). Again, the immunization code is inserted or otherwise associated with code or data to be received by a software service that relies on such code or data. Once associated, the code is considered "immunized" code. Exemplary logic can be triggered upon execution of the immunized code, upon issuance of a request prompted by the immunized code for more information (e.g., additional code or data), or one or more other events. For purposes of triggering, one or more hooks may be used to immunize code/data.

Various exemplary mechanisms can act, more generally, to prevent exploitation of known vulnerabilities that exist in software services that take scripts and other data for input operations. Such software services include, for example, SQL scripts.

With respect to implementation, various exemplary mechanisms can be implemented in association with an interior node of a network (e.g., on an enterprise firewall), an end node (e.g., a client with a software service), etc.

The description that follows discusses a system and some possible operations associated with various exemplary immunization mechanisms. Of course, implementation may occur in other systems or other manners. The description then discusses various exemplary methods or processes followed by an exemplary scenario for immunization of a HTML code. As already mentioned, various exemplary mechanisms may be used to reduce or eliminate exploitation risk of a software service that relies on scripts or other data as input for operations.

Figure 1:
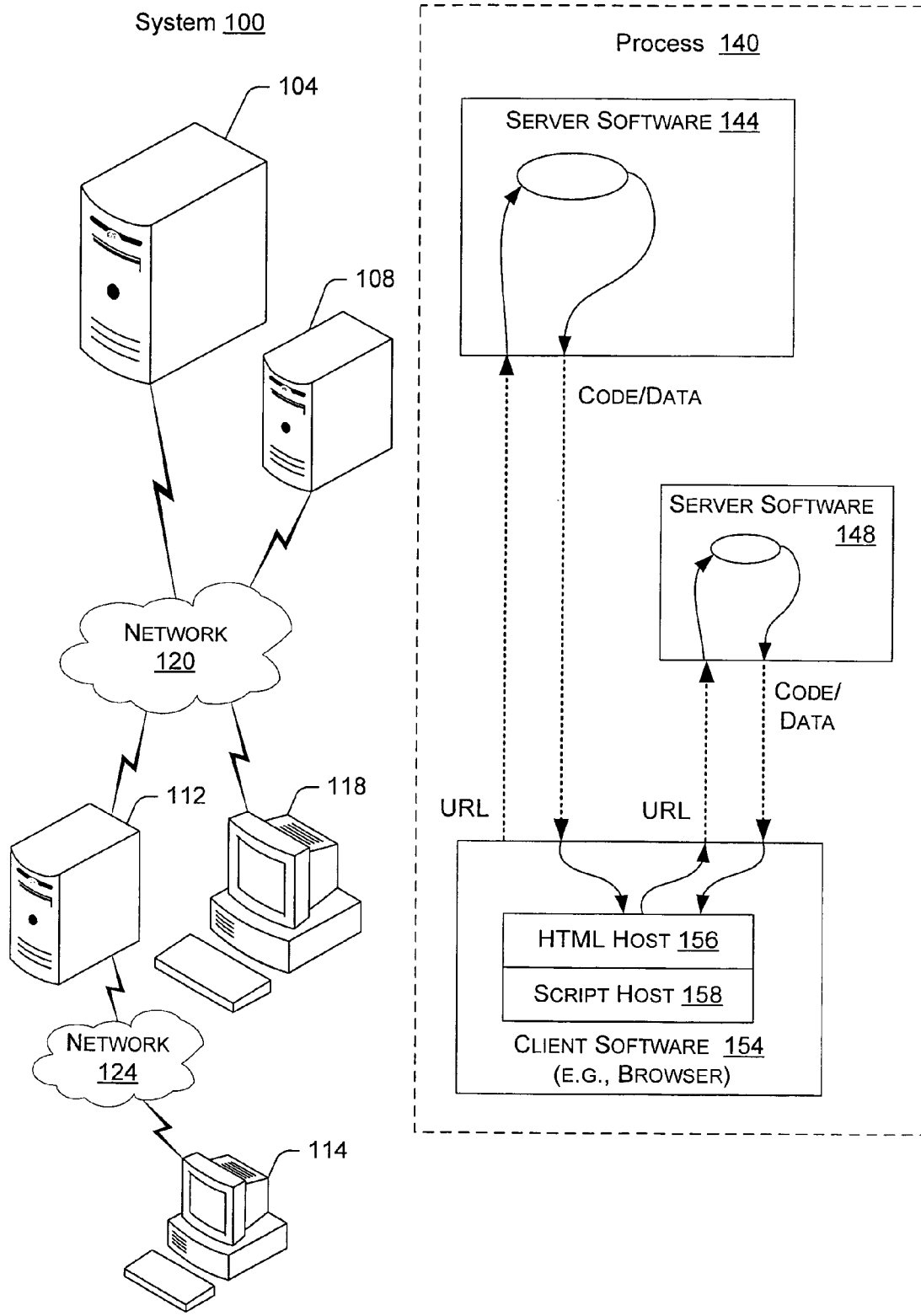
FIG. 1 is a diagram of a system and a process whereby resources may be accessed via one or more networks.

FIG. 1 shows a system 100 and a process 140 that may occur on such a system. The system 100 includes one or more servers 104, 108, 112, one or more clients 114, 118 and one or more networks 120, 124 for communication between various servers and clients. The network 120 may be the Internet while the network 124 may be an intranet where the server 112 operates as a local server.

In the system 100, a computer may operate as a firewall or a router device. A firewall is generally a set of related programs, located at a network gateway server that protects the resources of a private network from users from other networks. An enterprise with an intranet (e.g., the network 124) that allows its workers access to the wider Internet (e.g., the network 120) may install a firewall (e.g., on the server 112) to prevent outsiders from accessing its own private data resources and for controlling what outside resources its own users can access.

A firewall often works closely with a router program that can examine network packets to determine whether to forward a packet(s) to an intended destination. A firewall may also include or work with a proxy server that makes network requests on behalf of users (e.g., the client 114).

Various firewall screening techniques exist. For example, a firewall may screen requests to make sure they come from acceptable or trusted (e.g., previously identified) domain name and Internet Protocol addresses. A firewall may also screen domain names or addresses (e.g., URLs) to determine if they are associated with acceptable or trusted resources.

The process 140 of FIG. 1 pertains to a client browsing various resources using client software 154 such as browser software. In this example, the client software 154 includes an HTML host 156 and a script host 158. The client software 154 allows a user to enter or select a resource associated with a universal resource locator (URL). The client software 154 uses the URL to locate a resource such as information stored on one of the servers 104, 108, 112. In other examples, a server may include server software with such an HTML host, a script host, or both, i.e., while a client is indicated, such a process may include servers only, a mix of clients and servers, etc.

According to the process 144, a server that includes server software 144 receives a request for a resource or resources from the client software 154. In turn, the server software 144 executes a procedure that provides, for example, code in response to the request. The server software 144 may provide data other than code as an alternative or in addition to providing code. The client receives the code and the client software 154 uses the code, for example, to generate a frame for display on a user screen. Where the server software 144 provides data other than code, then the client software 154 may use the data.

Consider an example where the code includes code written in a markup language such as the hypertext markup language (HTML) and where the client software 154 is web browser software. The HTML host 156 of the browser software 154 includes a HTML parser such that when a page (e.g., a document) is accessed by the browser, the HTML parser reads the code (e.g., usually in the form of a file) and creates elements from HTML tags that appear in the code. For example, INTERNET EXPLORER® browser software (Microsoft Corporation, Redmond, Wash.) includes a component "Mshtml.dll" that performs the HTML parsing and rendering and it exposes an HTML document through the Dynamic HTML Object Model. This component can host one or more scripting engines, virtual machines, ACTIVEX® controls, plug-ins, and other objects that might be referenced in a loaded HTML document (e.g., code/data).

According to the process 140, the code may include script. For example, the JScript script language, which is an interpreted, object-based scripting language, may be used or another script language. Such scripts usually rely on a script interpreter or "host" (e.g., the script host 158). Examples of hosts for Jscript scripts include active server pages, Internet Explorer® and WINDOWS® script host. Again, while code is mentioned, data may be provided alternatively or in conjunction with code.

Figure 2:
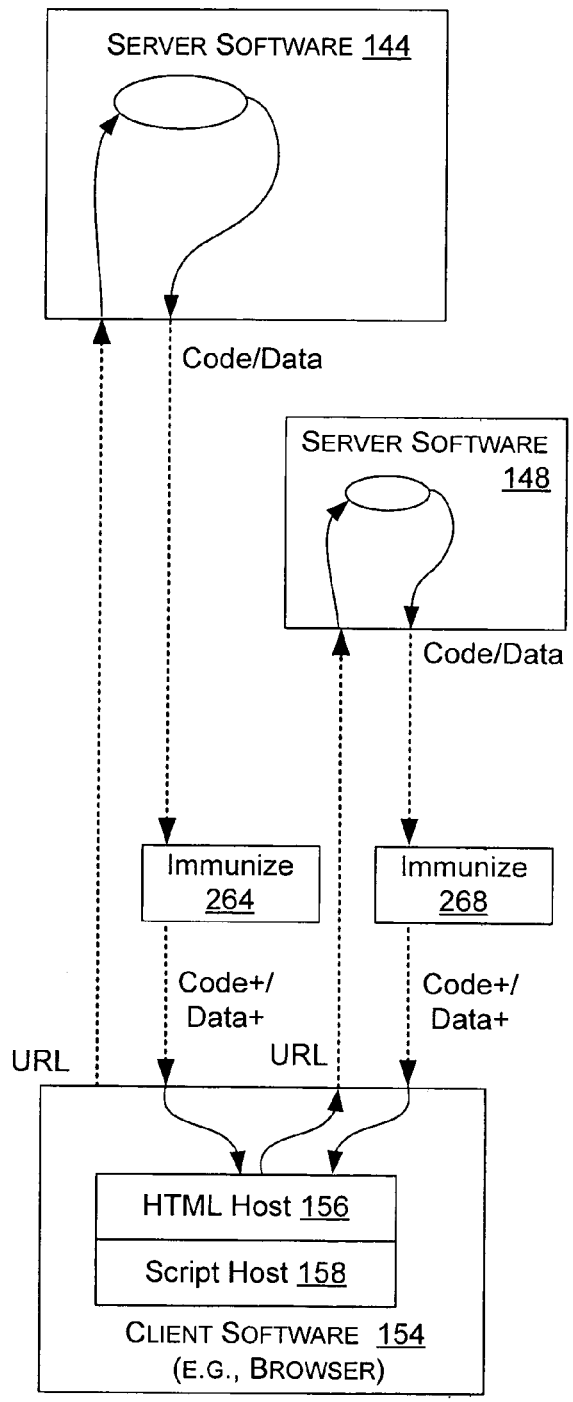
FIG. 2 is a diagram of an exemplary process that includes one or more immunization components for immunizing code/data.

FIG. 2 shows an exemplary process 240 which includes various features of the process 140; however, exemplary immunization capabilities 264, 268 are included. In this example, the immunization components 264, 268 act on code, data, or code and data prior to receipt by the client software 154. In other examples, immunization components may be part of client software. The selection of location for such an exemplary immunization component in a process can depend on a variety of factors. For example, an organization with an intranet (e.g., the network 124) may choose to locate such an immunization component on a firewall or gateway server (e.g., the server 112) for sake of maintenance, security, efficiency, etc.

In the example of FIG. 2 and various other examples, the term "code+/data+" identifies code, data or code and data that has been transformed (i.e., immunized) and, throughout, the term "code/data" refers to code, data or code and data. Transformed or immunized code/data can include code/data that has been checked to determine risk of its ability to exploit one or more software vulnerabilities (e.g., browser software vulnerabilities), code/data that has been injected with additional code that acts to perform such checks (e.g., at runtime or prior to runtime), code/data that has been injected with additional code that otherwise aims to prevent execution of malicious code at runtime. Again, in general, the process of immunizing or transforming generally involves inserting or otherwise associating code with received information (e.g., code, data, code and data) or altering (e.g., changing, deleting, etc.) received information and the resulting code/data is referred to as immunized or transformed code/data (e.g., code+/data+).

Figure 3:
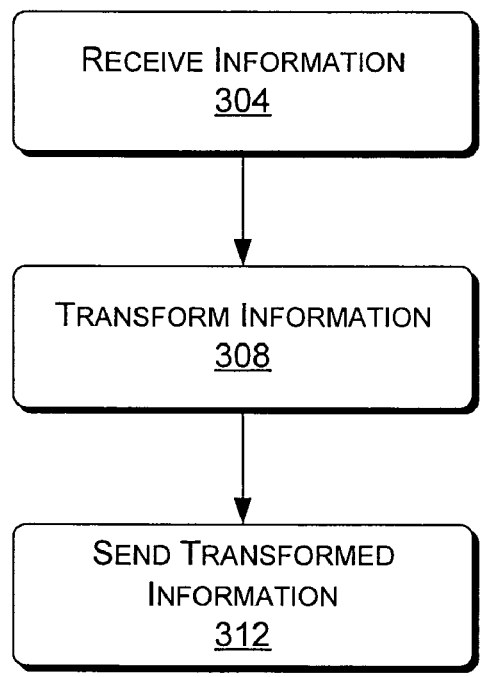
FIG. 3 is a diagram of an exemplary method for transforming information to prevent or reduce risk of an attack on a software vulnerability.

FIG. 3 shows an exemplary method that transforms or "immunizes" information to reduce or eliminate risk of exploitation of a known vulnerability of a software service. A reception block 304 receives information in response to a request where the received information is for consumption by a software service (e.g., a browser software service). For example, the received information may be code, data or code and data used by web browser software to present a web page on a user's computer monitor. The reception block 304 receives information, for example, from a server in response to a request by a user or other entity.

A transformation block 308 transforms the received information to produce transformed information where the transforming transforms the received information to reduce or eliminate the received information's ability to exploit a known vulnerability of a software service. A transmission or send block 312 transmits the transformed information, for example, to the entity that requested the information. In other examples, the transformed or "immunized" information may be directed to an entity other than that which made the request (e.g., an email immunization service may act to send immunized code to an entity or entities on behalf of another entity that requested code).

An exemplary method may include receiving HTML code that includes script and inserting a hook into the HTML code wherein the hook responds to a runtime event to call for action to prevent exploitation of a browser software vulnerability by the script. In such an example, the step of inserting a hook into the HTML code acts to immunize the code. If such an exemplary method occurs on a computer (e.g., a server) that is not an end user (e.g., for consumption of the received code), then the exemplary method may further send the immunized code to an intended recipient (e.g., a client).

In various examples, immunized data includes inserted or otherwise associated code with logic to prevent exploitation of one or more known vulnerabilities of a software service such as a browser software service.

Figure 4:
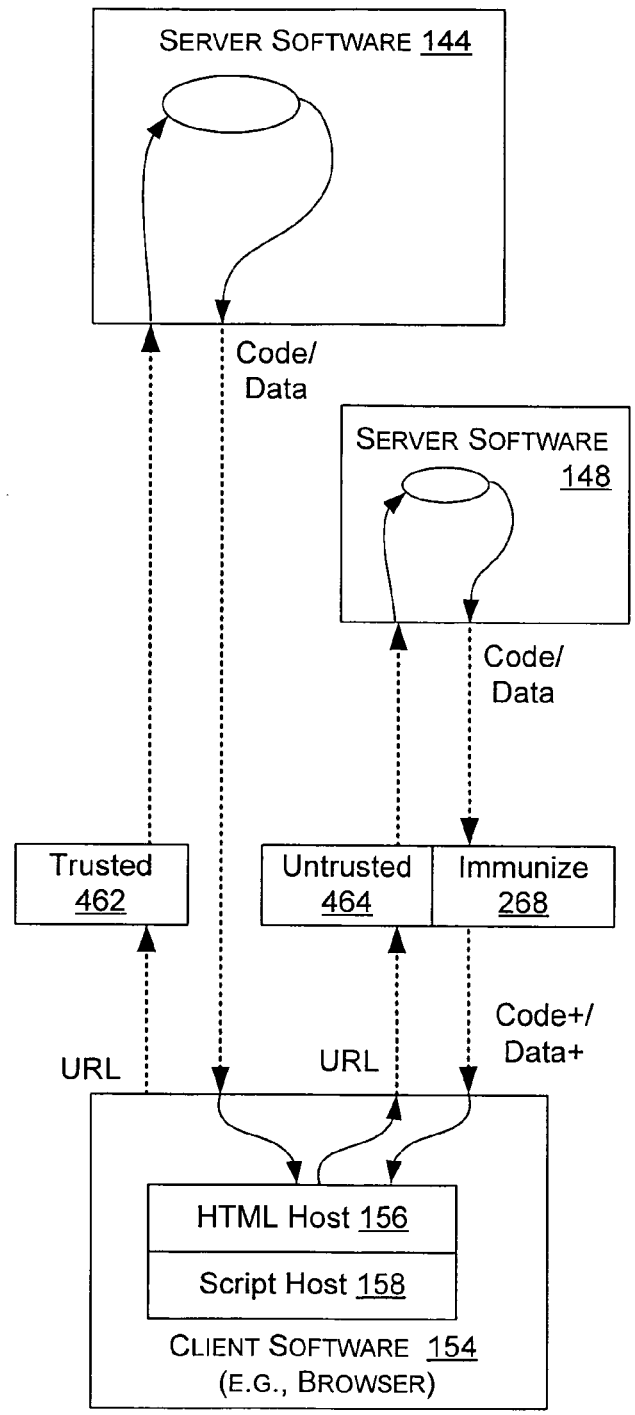
FIG. 4 is a diagram of an exemplary process that includes one or more trust components for determining whether a resource is trusted.

FIG. 4 shows an exemplary process 440 which includes various features of the process 140; however, trust capabilities 462, 464 and an exemplary immunization capability 268 are included. The trust capabilities 462, 464 can act according to a level of trust assigned to a resource, for example, as associated with a URL, etc. A trust component 462 may receive a URL or other resource identifier and determine a level of trust for the resource, for example, using an associated table or other information.

In the exemplary process 440, the client software 154 causes an initial URL to be sent. The trust component 462 receives the URL and determines that it is a trusted URL. As a trusted URL, immunization of code/data from the resource is not required and the code/data passes to the client software 154 as sent by the server software 144. However, upon execution of the code or use of the data by the client software 154, a subsequent request may be sent, for example, to request code/data (i.e., information) from another resource. The same trust component 462 may be used or another trust component 464.

In the exemplary process 440, the trust component 464 determines that the URL is untrustworthy or untrusted. In response to this determination, the immunization component 268 will receive any code/data sent from the source. In this example, the code/data sent (e.g., via execution of the server software 148) is received by the immunization component 268 prior to receipt by the client software 154. The immunization component 268 transforms (i.e., immunizes) the code/data to create immunized code/data (i.e., code+/data+). The client software 154 then receives the immunized code/data. Again, immunized code/data may include data and inserted or otherwise associated code that acts to prevent the data from exploiting a vulnerability associated with a software service. Alteration of code or data is also a possible transformation mechanism.

As already mentioned, the selection of location for such an exemplary immunization component(s) in a process can depend on a variety of factors. For example, an organization with an intranet (e.g., the network 124) may choose to locate such an immunization component on a firewall or gateway server (e.g., 112) for sake of maintenance, security, efficiency, etc. The same factors may apply to a trust component. Further, the two components (i.e., immunization and trust) may be part of a software package implementable on a client, server, etc., as appropriate.

Figure 5:
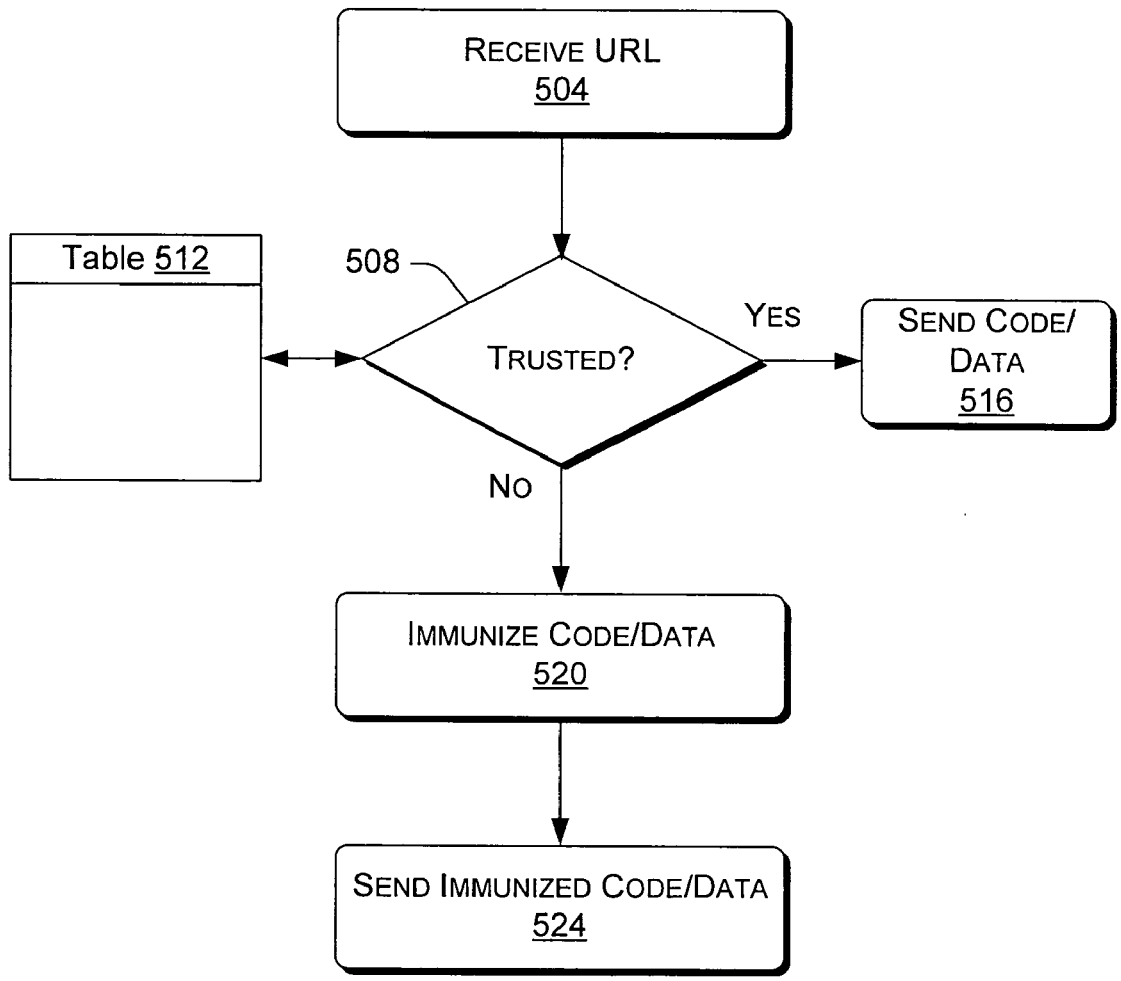
FIG. 5 is a diagram of an exemplary method for deciding whether a resource is trusted and, in response thereto, immunizing code/data from the resource.

FIG. 5 shows an exemplary method 500 for sending immunized code/data. Again, if, for example, an immunized component resides on a client that intends to use the code/data, then sending may simply provide the code/data to the appropriate client software.

According to the exemplary method 500, a receipt block 504 receives a URL as part of a request for code/data. A decision block 508 decides if the URL is a trusted URL, for example, using a look-up table 512. If the decision block 508 decides that the URL is a trusted URL, then a send block 516 acts to send code/data from the resource associated with the URL to the requester or other entity to which the code/data is directed.

If the decision block 508 decides that the URL does not correspond to a trusted resource, then an immunization block 520 acts to immunize the code/data and produce immunized code/data and a send block 524 acts to send the immunized code/data.

Figure 6:
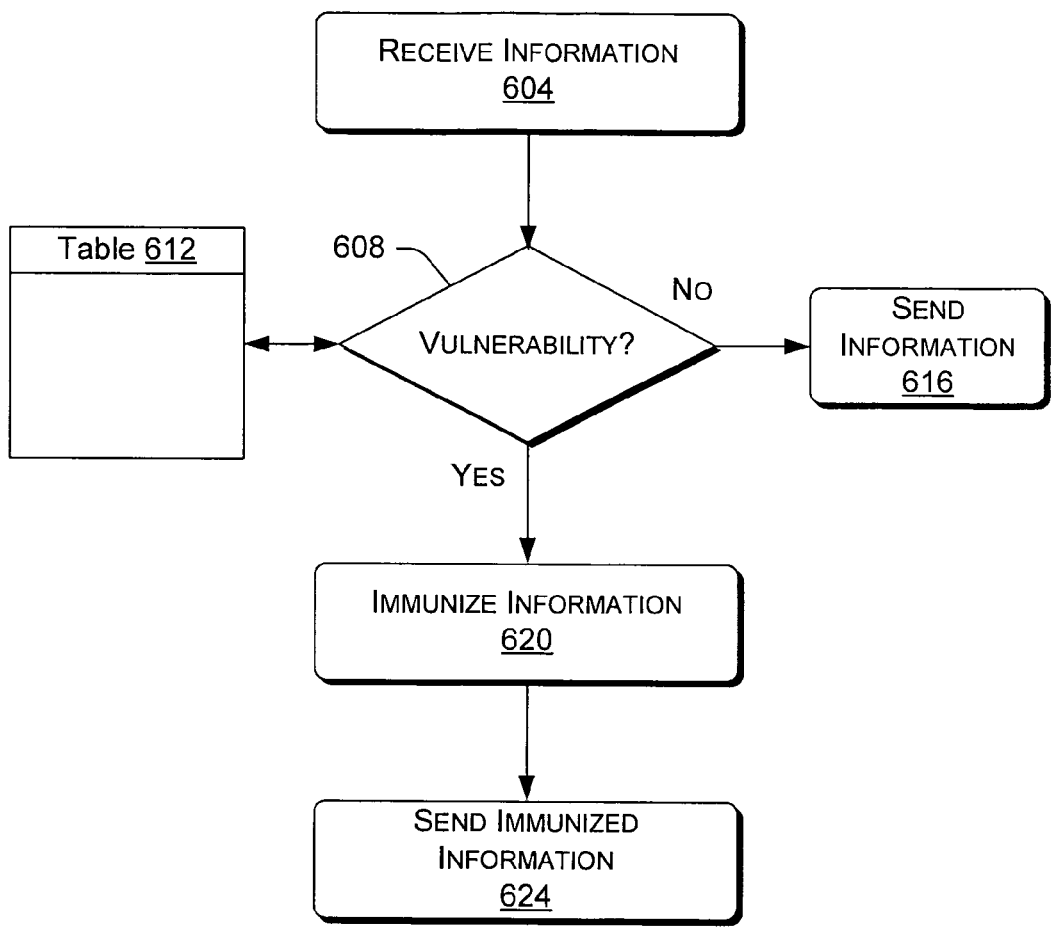
FIG. 6 is a diagram of an exemplary method for deciding whether received information may exploit or may attempt to exploit a software vulnerability.

FIG. 6 shows an exemplary method 600 for sending immunized information (e.g., code/data). According to the exemplary method 600, a receipt block 604 receives information from a resource. A decision block 608 decides if the received information may attempt to exploit one or more software vulnerabilities, for example, optionally relying in part on a look-up table 612. If the decision block 608 decides that the information does not include any features that may exploit known vulnerabilities, then a send block 616 acts to send the information. Such information may be considered as immunized information as it has been checked for its ability to exploit known vulnerabilities. In such instances, the information may be transformed to include an indicator (e.g., a segment of code or data) that indicates that attacks on various vulnerabilities are unlikely to occur or that the information has been checked per an immunization process.

As already mentioned, malicious code may mount an attack on a software vulnerability during setup or runtime. For example, malicious code may cause client software to send a URL that acts to request additional code. Such subsequent calls may be considered a type of vulnerability attack and thus the decision block 608 may decide that a risk of exploitation exists. As such, an exemplary immunization procedure may insert code or another indicator to protect or indicate that the code may try to call for additional code/data. Such additional code/data may be of yet undetermined trustworthiness or undetermined risk of attacking one or more software vulnerabilities.

If the decision block 608 decides that the received information includes one or more features that may exploit known vulnerabilities, then an immunization block 620 acts to immunize the received information and produce immunized information and a send block 624 acts to send the immunized information.

As already mentioned, an exemplary method may forego a check of received information (e.g., forego the decision block 608) and transform the received information to reduce or eliminate the risk of exploitation of one or more known software vulnerabilities by the received information. For example, referring again to the exemplary method 600, in such an instance, blocks 604, 620 and 624 may act to send immunized information.

Figure 7:
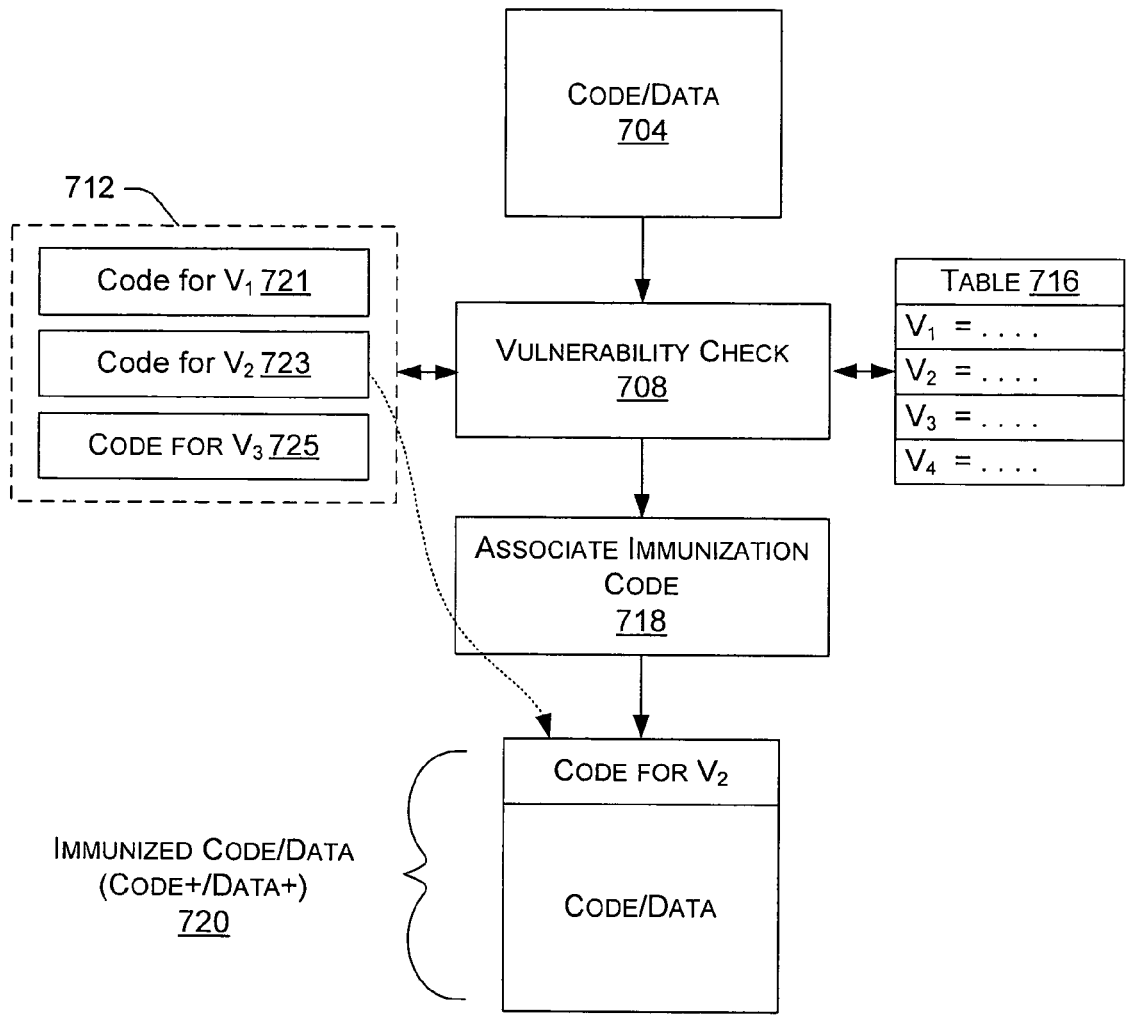
FIG. 7 is a diagram of an exemplary process for transforming code/data by associating specialized code with suspect code/data to prevent the suspect code/data from exploiting a software vulnerability.

FIG. 7 shows an exemplary process 700 where code to address one or more vulnerabilities is inserted, appended or otherwise associated with code/data to thereby eliminate or reduce risk exploitation of such a vulnerability or vulnerabilities. In this example, known vulnerabilities exist and code may exist for addressing at least some these known vulnerabilities. Accordingly, the exemplary process 700 may rely on such knowledge, for example, as it is stored locally or remotely, separately or together. To illustrate such an example, the exemplary process 700 includes an information table 716 of known vulnerabilities and various segments of immunization code 712 where the segments correspond to one or more known vulnerabilities (e.g., per the information table 716).

According to the exemplary process 700, code/data 704 is subject to a vulnerability check 708 that optionally relies on the table 716 of known vulnerabilities (e.g., $V_1$, $V_2$, $V_3$, $V_4$). On the basis of the check 708, the various segments of code 712 may be available to address a specific vulnerability or a group of vulnerabilities. For example, the segments of code 712 include code for $V_1$ 721, code for $V_2$ 723 and code for $V_3$ 725. The vulnerability $V_4$ may have no corresponding code. For example, $V_4$ may correspond to a vulnerability that cannot be addressed using code or it may correspond to a vulnerability that, if "fixed", would render the received code/data inoperable for its intended purpose.

The segments of code 712 and the table 716 may be available locally in association with the check 708 or that may reside remotely for purposes of maintenance, security, etc. In the exemplary process 700, the code/data 704 includes a vulnerability $V_2$ and thus, an association block 718 associates the code for $V_2$ with the code/data 704 to thereby form immunized code/data 720.

Association per the association block 718 optionally acts, for example, to insert one or more hooks into received code or associate a hook with received data. Such hooks may make local or remote calls that act to address actual or potential attacks on a software vulnerability. An exemplary hook may call a function or other coded operation where code for the function or coded operation is associated with the code/data 704. For example, the function or other coded operation may be inserted into the code/data 704.

For vulnerabilities associated with browser software, an exemplary immunization component (i.e., transformation component) may determine the type of browser and then, for example, use a table (e.g., the table 716) to determine particular vulnerabilities associated with the type of browser.

An exemplary immunization component optionally includes browser simulation software that can test suspect code or segments thereof for particular code associated with browser vulnerability.

With respect to web pages that rely on markup language, such pages may include static HTML pages or dynamic HTML pages. In general, a user requests a static page by typing in an URL, clicking a link pointing to an URL, etc. As already described, the URL request is sent to a server or other computer, which responds by returning the static HTML page (e.g., an HTML coded document).

Dynamic pages are generally created in response to a user's request. For example, browser software may act to collect information by presenting a page with text boxes, menus, check boxes, etc., that a user fills in or selects. Data from the form is then sent to, for example, a server that may pass the data to a script or application to be processed, query or post data to a database, etc. Then, the server returns the result(s) to the user in an HTML page.

While various scripts mentioned herein pertain generally to web browser software, other scripts exist, for example, associated with SQL and object-oriented programming languages such as the VISUAL BASICS language, etc. Various exemplary techniques described herein may be applied to suspect code where such scripts are used.

The various examples of FIGS. 2-7 demonstrate general use of such transformation or "immunization" technology. Described below are more specific examples of immunization technology to eliminate or reduce risk of exploitation of various software vulnerabilities, recognizing that vulnerabilities continually arise.

Various scenarios exist that can benefit from exemplary immunization processes discussed herein. A scenario may include suspect code that includes a <FRAME> tag with a potentially malicious SRC attribute value (e.g., SRC=file:// BBBBBBBBBBBBBBBBBBBBBBBBBBBBBBB). A long SRC attribute value is known to be associated with a known software vulnerability (e.g., risk of buffer overflow). An exemplary immunization component (e.g., the decision block 608 or the vulnerability check block 708) can recognize a "long" attribute value (e.g., file name) as being associated with a known software vulnerability and check code/data for whether, upon execution, it may attempt to exploit such a vulnerability. In this scenario, the immunization component may delete the value, alter the value, prevent the code from execution, alert a user, etc., in an effort to prevent exploitation of the vulnerability.

For example, consider the server 112 as a firewall that includes an exemplary immunization component (e.g., 264, 268) that scans HTML traffic for <FRAME> tags. For each tag found by the immunization component, a check occurs for long SRC attributes. In turn, the immunization component calls for corrective action, which may block malformed traffic, alter the code, etc.

An exemplary firewall server (e.g., the server 112) or routing device may include software (e.g., such as the software 144, 148) that allows the firewall server to receive code/data (e.g., information) from a resource (e.g., servers 104, 108) via a network (e.g., the network 120) and to send code/data to a client computer (e.g., the client computer 114) and an immunization component (e.g., components such as the components 264, 268) for immunizing the code/data to prevent exploitation of a vulnerability of browser software (e.g., the software 154) on the client computer. In such an example, the firewall the server software may further allow the firewall server to receive a URL from the client computer where the URL corresponds to a resource accessible via the network. Further, such an exemplary firewall may include a trust component (e.g., such as one of the components 462, 464) to determine if the URL is associated with a trusted resource and, based at least in part on the determination, deciding whether to receive the code/data from the resource or to immunize the code/data received from the resource using the immunization component.

FIG. 8 shows an exemplary scenario 800 that involves suspect code such as suspect code 830, which includes script. In contrast to the aforementioned suspect code/data (i.e., long SRC attribute value), the vulnerability exploiting risk for the suspect code 830 is associated with script. In this scenario, the malicious or problematic HTML tag is not in the page's HTML code, but is created by a script inside the HTML page in runtime, for example, on a client. Generally, it may be difficult to determine what a script will during execution, which increases its chance of successfully exploiting such script-related browser vulnerabilities.

To transform or "immunize" the suspect code 830, an exemplary immunization code segment 850 is created or selected, for example, by an immunization component (with respect to selection, see, e.g., the process 700). The exemplary code 850 includes script that defines an exemplary immunization function 854 "abcd( )" that acts to prevent realization of a vulnerability (e.g., associated with client side software). In this specific example, the function abcd( ) includes a variable "TheElement" that is used to detect a <FRAME> tag attribute and to determine if the value of the attribute exceeds a particular length (e.g., 25 characters). The function abcd( ) may look at an entire variable length (i.e., string1="<FRAME SRC=file:// BBBBBBBBBBBBBBBBBBBBBBBBBBBBBBB>") or it may consider a portion of a variable. For example, the function abcd( ) may consider only the SRC attribute value. Of course, an exemplary immunization code segment may consider both.

In the exemplary scenario 800, an exemplary immunization hook 874 is inserted into the suspect code 830 to produce exemplary immunized code 870. The hook 874 acts to call the exemplary immunization function 854 according to an "onpropertychange" in the code 870. Thus, the exemplary immunized code 870 includes the exemplary hook 874 that calls an exemplary immunization function 854. The code segment 850 for the function 854 may be appended to the vulnerable code 830 (e.g., immunized code 720 of FIG. 7).

As already mentioned with respect to FIG. 3, the exemplary method 300 may include receiving HTML code that includes script and inserting a hook into the HTML code wherein the hook responds to a runtime event to call for action to prevent exploitation of a browser software vulnerability by the script. Thus, the exemplary scenario 800 may be considered an implementation of such an exemplary method that includes receiving the suspect code 830 and inserting the exemplary hook 874 into the suspect code 830. The exemplary hook 874 responds to a runtime event and acts by calling a function that can determine if script in the suspect code 830 may act to exploit a browser software vulnerability.

Other exemplary scenarios exist where the hook may call for code located locally or remotely to address a vulnerability. For example, an exemplary hook may cause a client to call a firewall server that then sends an exemplary immunization code to the client. Various exemplary hooks and associated immunization code may be considered event handling code, as appropriate.

Various exemplary techniques described herein act to protect computers from known vulnerabilities with minimal disruption to web pages, as such techniques can be specific to known vulnerabilities and, hence, operate in a focused manner.

Various exemplary techniques can be implemented in a manner to shift computational burden to, for example, a client computer instead of a server such as a firewall server. In the exemplary scenario 800, a need to analyze the script in the code 830 may be avoided and the code immunized based on knowledge that the code includes script. Various exemplary techniques can have advantages over sandboxing as such techniques may occur with client state awareness and take into account user input on the client computer.

The exemplary scenario 800 can involve immunizing an HTML coded web page as it passes through a firewall, or a router device, by injecting additional script(s) into the HTML code. As already described, the script(s) may execute on a client computer and protect it from known vulnerabilities.

In various examples, inserted exemplary immunization script introduces event handling code which is executed when new HTML (or other instruction(s)) is created in runtime. For example, when new HTML is created and injected into a page, the immunization script may verify that it does not attack a known vulnerability before allowing it to continue. If the script attempts to mount an attack, execution may be blocked; whereas, if it does not, the page may continue to run without disruption.

Various exemplary techniques may optionally include use validation checks in addition to, for example, event capture or event handling scripts. Validation checks may be included every few lines or so in scripts for a page. Such validation checks may be used alone, as appropriate. For example, an exemplary immunization component may decide that such checks suffice given particular circumstances.

Various exemplary methods include inserting a hook into suspect code and blocking malicious action during runtime. For example, a firewall may act to insert event handling script into suspect code and client software may use the script during runtime to block malicious action of the suspect code.

Various exemplary methods may apply to dynamic HTML (DHTML), which can allow writing of script that can change HTML attributes that modify a given element. These attributes can include the SRC attribute on an img or iframe element, or the style attribute for a div element.

Exemplary Computing Environment

The various exemplary technologies may be implemented in different computer environments. The computer environment shown in FIG. 9 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 9 illustrates an example of a suitable computing system environment 900 on which various exemplary methods may be implemented. Various exemplary devices or systems may include any of the features of the exemplary environment 900. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various exemplary methods, applications, etc., may be described in the general context of computer-executable instructions, such as program modules, being executed by a computer. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 9, an exemplary system for implementing the various exemplary methods includes a general purpose computing device in the form of a computer 910. Components of computer 910 may include, but are not limited to, a processing unit 920, a system memory 930, and a system bus 921 that couples various system components including the system memory 930 to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a data media interface such as interface 940, and magnetic disk drive 951 and optical disk drive 955 are typically connected to the system bus 921 a data media interface that is optionally a removable memory interface. For purposes of explanation of the particular example, the magnetic disk drive 951 and the optical disk drive use the data media interface 940.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 621 via an interface, such as a video interface 990. In addition to the monitor 991, computers may also include other peripheral output devices such as speakers and printer, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the features described above relative to the computer 910. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in a remote memory storage device. By way of example, and not limitation, FIG. 9 illustrates remote application programs 985 as residing on the remote computer 980 (e.g., in memory of the remote computer 980). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method implemented on a computing device by a processor configured to execute instructions that, when executed by the processor, direct the computing device to perform acts comprising:

receiving information to generate new content on a client in response to a request from the client, the received information containing code, the code having a potential exploit of a web browser software vulnerability, the received information being for consumption by a software service executing on the client;

creating modified information from the received information by inserting a script into the received information configured to, upon an execution of the script, reduce or eliminate the code's ability to exploit the potential exploit of the web browser software vulnerability, the script reducing or eliminating the code's ability if the code attempts to exploit the potential exploit of the web browser software, the script allowing the code to run without disruption if the code does not attempt to exploit the potential exploit of the web browser software, the modified information including both the script and the code; and interpreting, via the software service executing on the client, the modified information including both the script and the code to generate the new content on the client.

2. The method of claim 1, wherein the client executes a procedure to insert the script into the received information.

3. The method of claim 1, wherein the inserting the script into the received information includes altering a received hypertext markup language (HTML) code.

4. The method of claim 1, wherein the inserting the script into the received information inserts the script into the received information at a server prior to a sending of the modified information including the script to the client.

5. The method of claim 1, wherein the interpreting the modified information including the script and the code interprets the modified information including the script and the code as a format having a same file format as the received information.

6. The method of claim 1, wherein the received information comprises hypertext markup language (HTML) code.

7. The method of claim 1, wherein the inserting the script into the received information comprises determining if a length of a <FRAME> tag attribute value in the received information is greater than a tag attribute length tolerance.

8. The method of claim 1, wherein the received information comprises a web page.

9. The method of claim 1, wherein the inserting the script into the received information comprises inserting a hook into the received information.

10. The method of claim 9, wherein the hook calls a function in response to a runtime event, the runtime event subsequent to a load event, a setup event, or both.

11. The method of claim 10, wherein the runtime event comprises an "onpropertychange" event.

12. The method of claim 1, further comprising determining if a universal resource locator (URL) associated with the received information corresponds to a trusted resource.

13. The method of claim 12, further comprising deciding whether to insert the script into the received information based on a determination that the URL corresponds to the trusted resource.

14. The method of claim 1, wherein the potential exploit of the web browser software vulnerability includes functionality that causes the software service to request additional code, and wherein the method further comprises checking the code for the functionality.

15. A system comprising:
one or more processors; and
memory including instructions executable by the one or more processors to:
receive hypertext markup language (HTML) data that includes code having a potential exploit of a browser software vulnerability in response to a request from the system, wherein the received HTML data is for consumption by browser software executable by the system,
determine a level of trust for a source of the received HTML data,
insert an event handle hook into the HTML data to, upon execution of the event handle hook, inhibit an ability of the code to exploit the browser software vulnerability, the ability of the code to exploit the browser software vulnerability inhibited if the code attempts to exploit the browser software vulnerability, and
interpret the HTML data via the browser software, including an interpretation of both the code and the inserted hook.

16. The system of claim 15, wherein the event handle hook calls a function in response to a runtime event.

17. The system of claim 15, wherein the event handle hook calls a function to determine whether the HTML data exploits the browser software vulnerability.

18. A computer-readable storage device that comprises instructions executable by a processor to implement a method comprising:
receiving a web page from a web server via a network, the receiving responsive to a request from a client computer to select a resource associated with a universal resource locator (URL), the web page for consumption by a web browser software executable by the client computer; and
inserting a script into the received web page to, upon execution of the script, prevent the web page from infecting the web browser software executable on the client computer, the inserting a script including maintaining a software vulnerability of the web page unaltered, the web page prevented from infecting the web browser software upon an attempt to infect the web browser by the web page.

19. The computer-readable storage device of claim 18, wherein the web browser software includes a script host.

20. The computer-readable storage device of claim 19, wherein the method further comprises:
determining if the URL is associated with a trusted resource and,
deciding, based at least in part on the determination, whether to receive the web page or to insert the script into the web page.

* * * * *